United States Patent
Marechal

(10) Patent No.: US 8,820,697 B2
(45) Date of Patent: Sep. 2, 2014

(54) SYSTEM FOR ENGAGING AN AIRCRAFT SEAT IN A FASTENING RAIL

(75) Inventor: Xavier Marechal, Paris (FR)

(73) Assignee: Attax, Carriers sur Seine (FR)

( * ) Notice: Subject to any disclaimer, the term of this patent is extended or adjusted under 35 U.S.C. 154(b) by 56 days.

(21) Appl. No.: 13/108,543

(22) Filed: May 16, 2011

(65) Prior Publication Data

US 2011/0278422 A1 Nov. 17, 2011

(30) Foreign Application Priority Data

May 17, 2010 (FR) ..................................... 10 53776

(51) Int. Cl.
*A47B 97/00* (2006.01)
(52) U.S. Cl.
USPC ...... 248/503.1; 248/424; 248/429; 244/118.6
(58) Field of Classification Search
CPC .......... B64D 11/06; B64C 1/20; B60N 2/005; A47B 97/00
USPC .............. 248/503.1, 503, 500, 680, 681, 157, 248/424, 429; 244/118.5, 118.1, 119, 244/188.6, 118.6, 122 R; 410/101, 104, 410/105; 296/65.15, 65.12
See application file for complete search history.

(56) References Cited

U.S. PATENT DOCUMENTS

| | | | | |
|---|---|---|---|---|
| 3,486,204 A | * | 12/1969 | Miller, Jr. et al. | 24/606 |
| 4,062,298 A | * | 12/1977 | Weik | 410/105 |
| 4,396,175 A | * | 8/1983 | Long et al. | 248/503.1 |
| 4,771,969 A | * | 9/1988 | Dowd | 244/118.6 |
| 5,489,172 A | * | 2/1996 | Michler | 410/105 |
| 5,871,318 A | * | 2/1999 | Dixon et al. | 410/105 |
| 6,902,365 B1 | * | 6/2005 | Dowty | 410/105 |
| 7,455,276 B2 | * | 11/2008 | Frey | 248/500 |
| 7,641,426 B2 | * | 1/2010 | Stubbe | 410/105 |
| 7,661,637 B2 | * | 2/2010 | Mejuhas et al. | 248/157 |
| 7,785,053 B2 | * | 8/2010 | Hudson | 410/105 |
| 8,251,623 B2 | * | 8/2012 | Marechal | 410/105 |
| 2007/0090261 A1 | | 4/2007 | Mehujas et al. | |
| 2007/0228215 A1 | * | 10/2007 | Hudson et al. | 244/118.1 |
| 2010/0090060 A1 | * | 4/2010 | Marechal | 244/118.6 |
| 2011/0006160 A1 | * | 1/2011 | Marechal | 244/131 |

FOREIGN PATENT DOCUMENTS

| | | |
|---|---|---|
| EP | 1 607 329 | 12/2005 |
| FR | 2 893 996 | 6/2007 |
| GB | 2 337 454 | 11/1999 |

OTHER PUBLICATIONS

FR1053776 Search Report (Jan. 14, 2011).

* cited by examiner

*Primary Examiner* — Nkeisha Smith
(74) *Attorney, Agent, or Firm* — Patterson & Sheridan, L.L.P.

(57) ABSTRACT

The system for engaging an aircraft seat in a fastening rail of the rest of said aircraft, of the type including a catching means able to be moved between an assembly/disassembly position of the seat and an active position locking said seat in position, via a handling lever that can be moved by an assembly operator between an assembly/disassembly position and a locking position, and including a means for locking the lever in the locking position, able to be disengaged by the operator via a quarter turn means, to release the lever and therefore release the catching means, is characterized in that at least one handling portion of the quarter turn means for disengaging the locking means of the lever is accessible to the operator, from the upper face of the catching means.

2 Claims, 5 Drawing Sheets

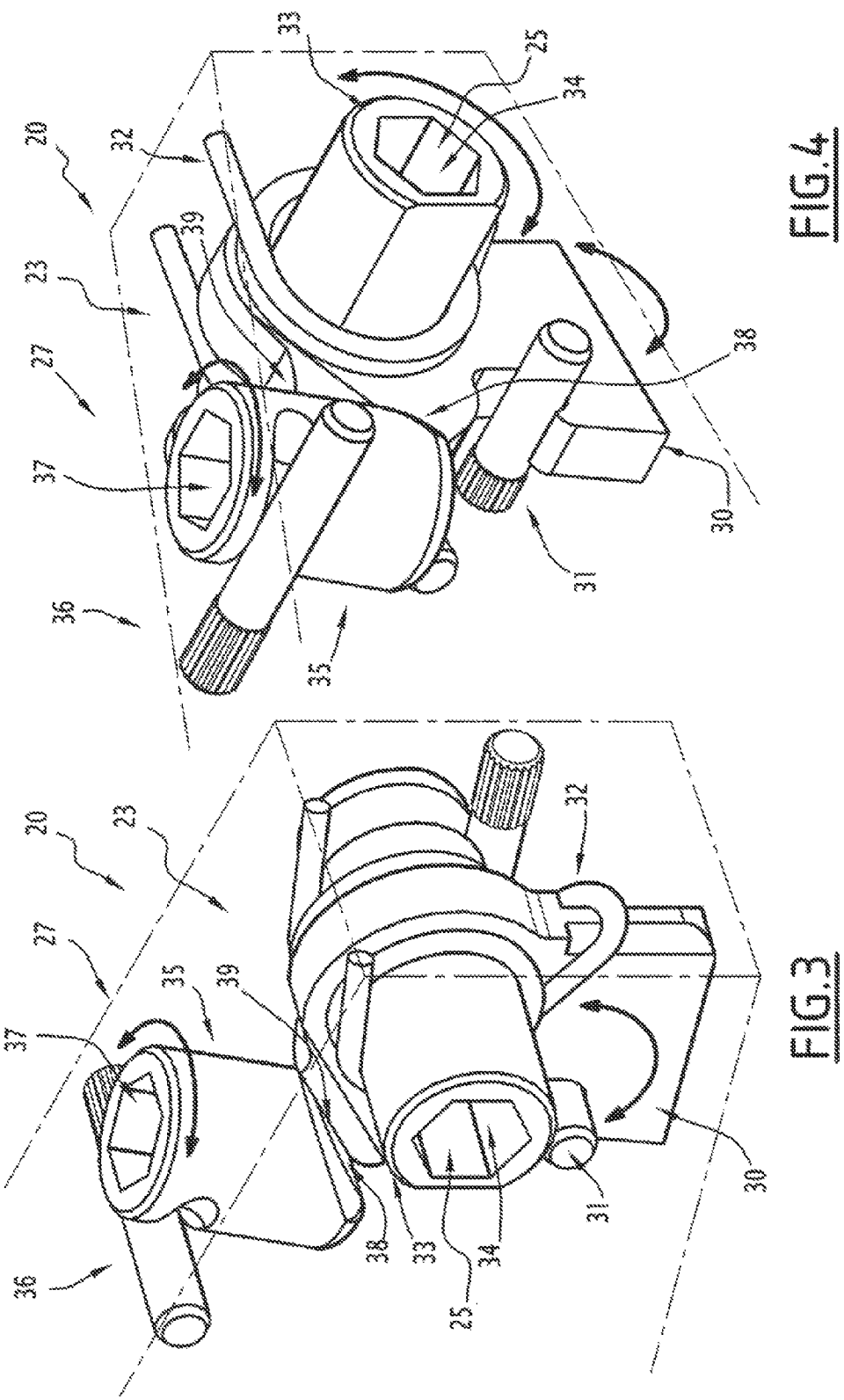

SYSTEM FOR ENGAGING AN AIRCRAFT SEAT IN A FASTENING RAIL

CROSS-REFERENCE TO RELATED APPLICATIONS

This application claims benefit of French patent application number 1053776, filed May 17, 2010, which is herein incorporated by reference.

BACKGROUND OF THE INVENTION

1. Field of the Invention

The present invention relates to a system for engaging an aircraft seat in a fastening rail of the rest of said aircraft.

More specifically, the invention relates to such an engagement system that includes catching means able to be moved between an assembly/disassembly position of the seat and a position for locking said seat in position, via a handling lever able to be moved by an assembly operator between an assembly/disassembly position and a locking position and including a means for locking the lever in the locking position, able to be disengaged by the operator via quarter turn means, to release the lever and therefore unlock the catching means.

2. Description of the Related Art

In the state of the art, the quarter turn means for disengaging the locking means of the lever comprises a disengaging pin provided at one end, with a cavity actuated by a tool provided to the operator.

However, in the known systems of the state of the art, the pin is arranged transversely relative to the catching means so that its cavity for actuation by the operator is accessible to the latter from one of the sides of the catching means.

However, it has been noted that this has a certain number of drawbacks, more specifically in terms of the accessibility of said cavity in particular when the covering, such as any carpeting, for example, of the floor of the aircraft, is relatively thick.

The aim of the invention is therefore to resolve these problems.

SUMMARY OF THE INVENTION

The invention relates to a system for engaging an aircraft seat in a fastening rail of the rest of said aircraft, of the type including a catching means capable of being moved between an assembly/disassembly position of the seat and an active position locking said seat in position, via a handling lever that can be moved by an assembly operator between an assembly/disassembly position and a locking position, and including a means for locking the lever in the locking position, which can be disengaged by the operator using a quarter turn means, to release the lever and therefore release the catching means, characterized in that at least one handling portion of the quarter turn means for disengaging the locking means of the lever is accessible to the operator, from the upper face of the catching means, in that the quarter turn means includes a disengaging pin provided at one end with a portion to be actuated by the operator and at another end with a cam-shaped portion adapted to cooperate with a corresponding bearing zone of the locking means to push them and therefore release them, in that the lever includes, at one end, a hinge means on a base of the catching means and at the other end a locking means and the quarter turn means for disengaging it, and in that the locking means includes latch-shaped means supported by one of the members, lever or base, and adapted to cooperate in the active position with the retaining means of the other member at the bottom of the lever, to lock the lever in the active position, the latch means being mounted so as to be able to move on the corresponding member against the stress from elastic means, to allow said latch means to cross the retaining means and engage in the locking position therewith, and to release itself from said retaining means, under the action of the quarter turn means during disengagement thereof.

According to other aspects of the invention, the system for engaging an aircraft seat comprises one or more of the following features:

the portion to be actuated by the operator of the disengaging pin includes a hollow cavity at the corresponding end thereof, adapted to receive a tool provided to the operator, and the latch means is supported by the corresponding end of the lever and the retaining means is associated with the base.

BRIEF DESCRIPTION OF THE DRAWINGS

The invention will be better understood using the following description, provided solely as an example and done in reference to the appended drawings, in which:

FIGS. 3 and 4 show detailed perspective views of an example of an embodiment of a locking means associated with a disengaging pin included in the composition of a system according to the invention.

DETAILED DESCRIPTION

Figure 1:
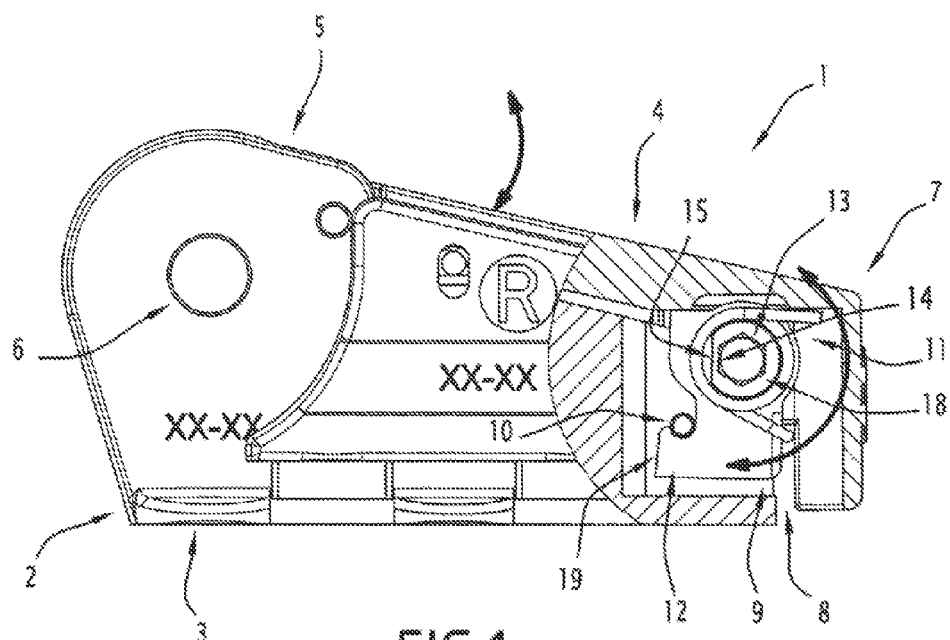
FIG. 1 shows a side view of a fastening system of the state of the art with a portion removed illustrating an example of an embodiment of a means for locking a lever in the active position.

These figures, and in particular FIG. 1, show a system for fastening a seat, in particular an aircraft seat, on the rest of said aircraft, this system being designated using general reference 1 in FIG. 1.

This system includes a base designated by general reference 2 associated with the rest of the seat and which includes means for engaging the latter on the rest of the aircraft and in particular in a rail thereof, this catching means for example being designated by general reference 3.

In fact this catching means can be moved between a retracted assembly/disassembly position of the seat and an active position locking said seat in position, via a handling lever designated by general reference 4 in FIG. 1, which itself can be moved between a retracted assembly/disassembly position of the catching means and an active position locking the catching means in position, for example by an operator.

One of the ends of this lever, i.e. for example its end designated by general reference 5, includes hinge means on the base 2, made up for example of a hinge pin designated by general reference 6 in FIG. 1, and the other end of said lever 4 includes disengageable means for locking the lever in the active position, said end of the lever being designated by general reference 7 and the locking means being designated by general reference 8.

In fact and as shown in FIG. 1, this locking means 8 for example includes a latch means designated by general reference 9 in FIG. 1, supported by one of the members, lever or base, and adapted to cooperate in the active position with a retaining means of the other member, i.e. the base or the lever.

In FIG. 1, the retaining means is formed by a retaining rod and is designated by general reference 10.

In fact and in the described example, the latch means 9 is supported by the corresponding end of the lever 4 while the retaining means 10 is connected to the base 2.

It is then possible to see that the latch means 9 is adapted to cooperate with a retaining means 10 to lock the lever 4 in the active locking position.

As illustrated, the latch means 9 is mounted able to move on the corresponding member against the stress from elastic means designated by general reference 11 in this figure, which allows said latch means 9 to cross the retaining means 10 while pivotably retracting and to engage in the locking position with them during the movement of said lever towards its active position.

This elastic means also allows said latch means 9 to free itself from said retaining means 10 under the action of rotating handling means, during disengagement thereof, for example actuated by the operator.

In fact and as illustrated, the latch means 9 includes, at one end, a hook-shaped portion designated by general reference 12 adapted to cooperate with a retaining means 10 that then for example comprises the retaining rod.

The latch means 9 is also associated with hinge means on the corresponding member, i.e. in the described example, on the lever 4, made up for example of a hinge pin designated by general reference 13, adapted to be engaged in a hole of this latch means 9.

As illustrated in FIG. 1, said hinge pin 13 for example includes a flat portion designated by general reference 14 adapted to cooperate with a complementary flat portion 15 of said hole to ensure a rotating connection of said two pieces.

The hinge pin 13 is then rotatably mounted in holes of the lever and is kept in position in said holes via a locking rod. This hinge pin 13 and more particularly one of its ends, for example, is provided with a handling cavity designated by general reference 18 in the figures, which is adapted to cooperate with a rotating handling member to move the latch means 9 towards its disengaging position of the retaining means, against the stress from the elastic means 11.

In the illustrated embodiment, this handling cavity 18 is formed by a recess with six faces at the end of the hinge pin 13. This hinge pin then extends transversely relative to the base such that the cavity 18 is accessible to the operator on one of the sides of the catching means.

Moreover and as also illustrated in these figures, the latch means 9 includes a ramp portion designated by general reference 19 in this figure, facilitating their crossing of the retaining means during their engagement in the locking position.

It is then possible to see that when the lever 4 is moved towards its active locking position, this ramp portion 19 first bears against the retaining means 10. As the lever continues to move towards its active position, this ramp portion crosses the retaining means, the latch means retracts while pivoting slightly against the stress from the elastic means 11 during said crossing.

Once the hook-shaped portion 12 of the latch means has crossed the retaining means 10, the elastic stress means 11 returns it to the locking position as shown in FIG. 1.

This structure then makes it possible to obtain reliable locking in the locked position of the lever 4.

When the lever needs to be unlocked, one need only engage a corresponding handling member in the cavity 18 of the end of the hinge pin 13 and make said pin pivot slightly, for example by a quarter revolution, and therefore the latch means, to release them and disengage them from the retaining means 10 in order to release the lever 4 and therefore allow it to move towards its retracted unlocking position.

Of course, other embodiments can be considered.

As previously indicated, the fact that the quarter turn means for disengaging the locking means of the lever is arranged transversely relative to the catching means makes it so that their actuating end, i.e. the receiving cavity of the handling member, by the operator, is accessible from one of the sides thereof.

Figure 2:
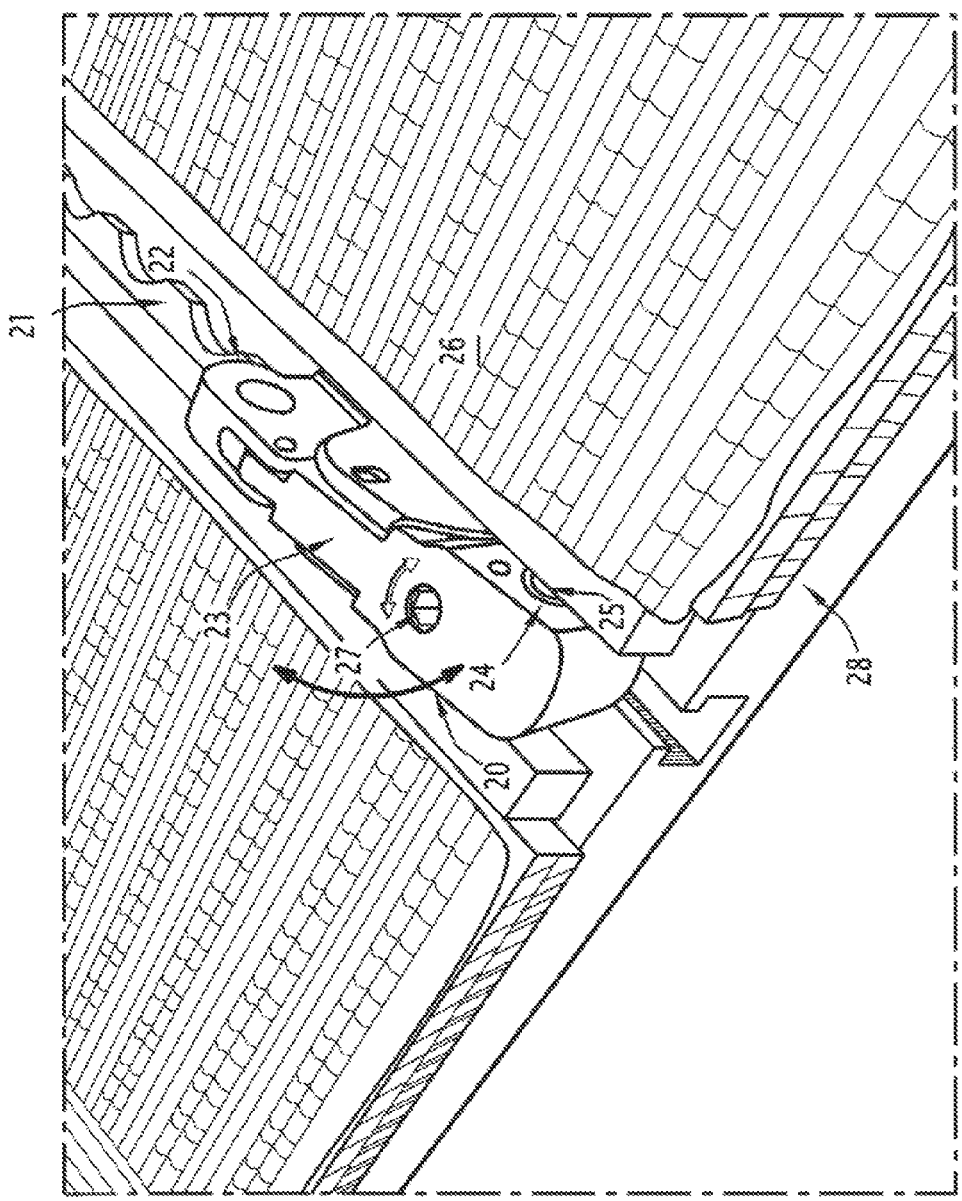
FIG. 2 illustrates the installation of an engagement system according to the invention in a fastening rail of the rest of the aircraft.

However and as illustrated in FIG. 2, this arrangement has a certain number of drawbacks, in particular when a thick covering, such as a thick carpet, covers the floor of the aircraft.

FIG. 2 in fact shows an engagement system for engaging an aircraft seat in a fastening rail of the rest of said aircraft that may have a structure similar to that previously described.

In this FIG. 2, the system then includes a catching means 20 for engaging the seat in a rail 21 of the rest of the aircraft, the catching means including a base designated by general reference 22 connected to a lever designated by general reference 23.

The base and the lever can have a structure similar to that previously described in reference to FIG. 1 and at the end of the lever and more particularly on one of the sides of said end, it is possible to see a hinge pin designated by general reference 24 and the handling cavity thereof designated by general reference 25, which is partially concealed by a thick covering designated by general reference 26 placed on the floor of the aircraft designated by general reference 28.

In the illustrated example, the thickness of the covering is such that the cavity 25 is practically impossible for the operator to access to engage any handling tool therein.

To resolve this problem, in the engagement system according to the invention as illustrated, at least one handling portion of the quarter turn means for disengaging the locking means of the lever is accessible to the operator from the upper face of the catching means.

This means is designated by general reference 27 in this FIG. 2 and is illustrated in more detail in FIGS. 3 and 4.

These FIGS. 3 and 4 show locking means of the lever which include a latch-shaped means designated by general reference 30 adapted to cooperate in the active position with a retaining means designated by general reference 31 to lock the lever in the active position. The latch means is mounted so as to be able to move on the corresponding member against the stress from elastic means designated by general reference 32.

This latch means and this elastic means are then necessarily connected to a hinge pin designated by general reference 33 whereof at least one end is provided with a handling cavity 34 adapted to receive a tool used by the operator to move them for example by a quarter revolution in order to unlock the latch means and release the lever.

To resolve the problems previously mentioned, in the engagement system according to the invention, a handling portion of the quarter turn means for disengaging this locking means of the lever is also accessible to the operator from the upper surface of the catching means.

This means has been designated by general reference 27 in FIGS. 3 and 4 and then includes another pin designated by general reference 35 engaged in a corresponding hole of the corresponding end of the lever, for example 23, and maintained therein for example by a maintaining rod designated by general reference 36.

The upper end of said pin 35 is then provided with a cavity for receiving the tool provided to the operator, this cavity being designated by general reference 37 in these figures.

It of course goes without saying that other forms of the actuating portion of this disengaging pin, by the operator, can be provided at the corresponding end of said pin.

Furthermore, this pin includes, at another end, a cam-shaped portion designated by general reference 38 in these figures adapted to cooperate with a corresponding bearing zone 39 of the locking means and more particularly in the described example of the latch, to push the latter and therefore release it.

It can then be seen that in the situation previously described, in which the covering of the aircraft floor is thick, the operator still has access to the cavity 37 from the upper face of the catching means and in particular of the lever 23 described relative to FIG. 2 to release the system.

Figure 5:
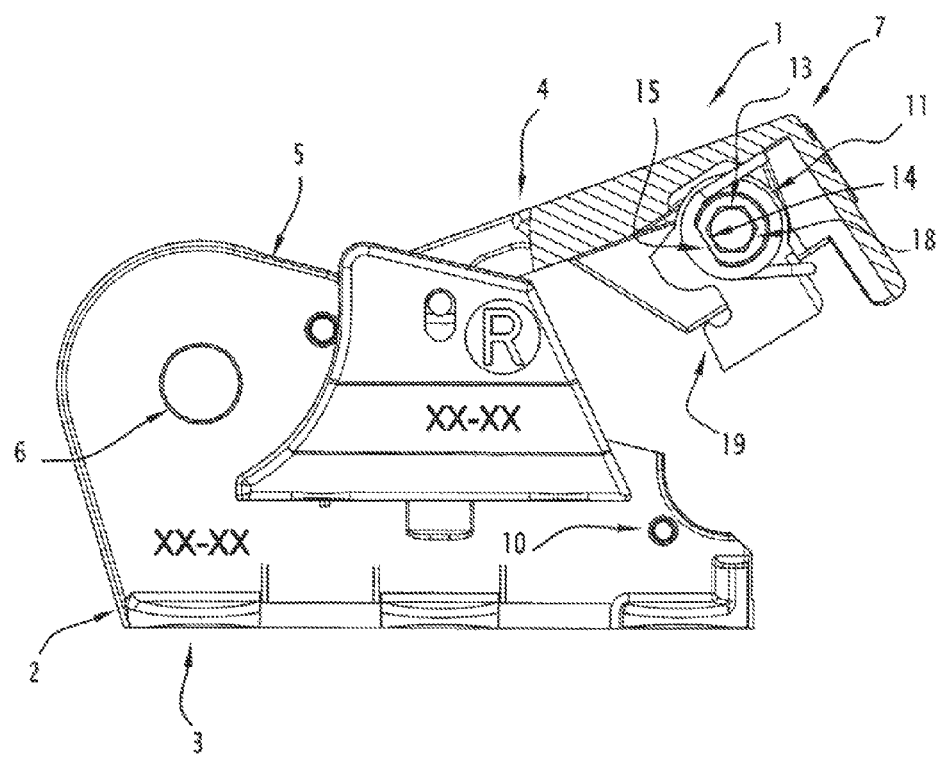
FIG. 5 illustrates the catching system of FIG. 1 in the unlocked position.

FIG. 5 illustrates the catching system of FIG. 1 in the unlocked position.

Figure 6:
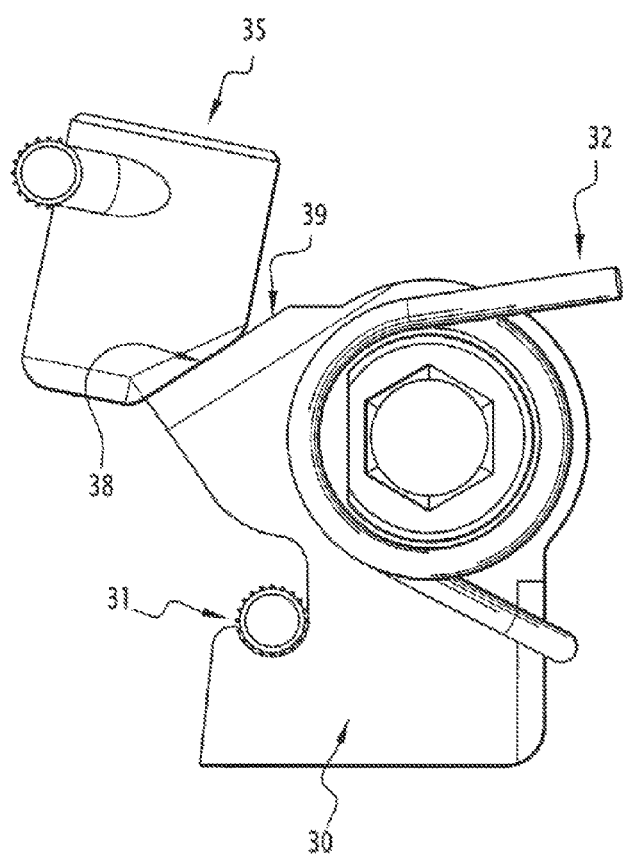
FIG. 6 illustrates a bearing zone and cam, according to one embodiment of this disclosure.

FIG. 6 illustrates a bearing zone and cam, according to one embodiment of this disclosure.

It of course goes without saying that other embodiments can be considered, inasmuch as a portion at least of the handling means of the quarter turn means for disengaging the locking means of the lever is accessible to the operator from the upper face of the locking means.

The invention claimed is:

1. A catching system for fastening an aircraft seat to a rail in an aircraft, the system comprising:
   a base for positioning the catching system within the rail;
   a handling lever rotatably connected to the base, the handling lever being movable to position the catching system in a locked position or an unlocked position within the rail; and
   a locking assembly that comprises a retaining means and a latch means that cooperates with the retaining means to position the catching system in the locked position,
   the retaining means being supported by the base and the latch means being supported by the handling lever,
   the latch means being rotatably connected to a hinge pin extending perpendicularly thereto,
   the locking assembly further comprising an elastic member that stresses the latch means toward the retaining means and a bearing on a side of the latch means zone for receiving a cam-shaped portion, the locking assembly further including a quarter turn means to unlock the locking assembly located within the handling lever, the quarter turn means comprising:
      a rotatable disengaging pin that includes the cam-shaped portion at a bottom face that engages the bearing zone to release the latch means from the retaining means and unlock the catching system, wherein the disengaging pin further includes a cavity positioned on an upper face of the disengaging pin and accessible from a top of the handling lever for receiving a tool that is operable to rotate the disengaging pin to unlock the catching system.

2. The catching system of claim 1, wherein the disengaging pin only rotates up to a quarter turn to unlock the catching system.

* * * * *

UNITED STATES PATENT AND TRADEMARK OFFICE
CERTIFICATE OF CORRECTION

PATENT NO.         : 8,820,697 B2
APPLICATION NO.    : 13/108543
DATED              : September 2, 2014
INVENTOR(S)        : Xavier Marechal It is certified that error appears in the above-identified patent and that said Letters Patent is hereby corrected as shown below:

Title Page, (73) Assignee:

Please delete "Carriers sur Seine" and insert --Carrieres sur Seine-- therefor.

Signed and Sealed this
Tenth Day of February, 2015

Michelle K. Lee
*Deputy Director of the United States Patent and Trademark Office*